United States Patent
Ku et al.

(10) Patent No.: US 8,175,251 B2
(45) Date of Patent: May 8, 2012

(54) METHOD AND SYSTEM TO BYPASS ENUM TO REACH A CALLEE VIA A PSTN OR A PLMN

(75) Inventors: Bernard Siu-Man Ku, Plano, TX (US); Alex Huang, Austin, TX (US); Armstrong Soo, San Francisco, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 398 days.

(21) Appl. No.: 12/604,974

(22) Filed: Oct. 23, 2009

(65) Prior Publication Data

US 2010/0040052 A1 Feb. 18, 2010

Related U.S. Application Data

(63) Continuation of application No. 11/482,098, filed on Jul. 6, 2006, now Pat. No. 7,630,485.

(51) Int. Cl.
*H04M 7/00* (2006.01)

(52) U.S. Cl. ............... 379/221.13; 379/221.01; 379/352

(58) Field of Classification Search ............. 379/221.13, 379/221.01; 370/352
See application file for complete search history.

(56) References Cited

U.S. PATENT DOCUMENTS

| | | | |
|---|---|---|---|
| 6,665,293 B2 | 12/2003 | Thornton et al. | |
| 6,700,956 B2 | 3/2004 | Chang et al. | |
| 6,865,266 B1 | 3/2005 | Pershan | |
| 6,968,050 B1 | 11/2005 | Pershan et al. | |
| 6,973,091 B1 | 12/2005 | Hester | |
| 7,002,973 B2 | 2/2006 | MeLampy et al. | |
| 7,016,343 B1 | 3/2006 | Mermel et al. | |
| 7,028,092 B2 | 4/2006 | MeLampy et al. | |
| 7,480,915 B2 | 1/2009 | Costa Requena et al. | |
| 2003/0053446 A1 | 3/2003 | Kwon | |
| 2005/0135342 A1 | 6/2005 | Kim | |
| 2005/0190721 A1 | 9/2005 | Pershan | |
| 2005/0195802 A1 | 9/2005 | Klein et al. | |
| 2005/0265322 A1 | 12/2005 | Hester | |
| 2006/0034270 A1 | 2/2006 | Haase et al. | |
| 2006/0072575 A1 | 4/2006 | Miyajima et al. | |
| 2007/0036143 A1 | 2/2007 | Alt et al. | |
| 2007/0061397 A1 | 3/2007 | Gregorat et al. | |
| 2007/0071221 A1 | 3/2007 | Allen et al. | |
| 2007/0258575 A1 | 11/2007 | Douglas et al. | |

OTHER PUBLICATIONS

U.S. Appl. No. 60/764,748, filed Feb. 2, 2006, Allen, et al.

*Primary Examiner* — Simon Sing
*Assistant Examiner* — Simon King
(74) *Attorney, Agent, or Firm* — Toler Law Group, PC

(57) ABSTRACT

At least one telephone network element receives an attempt of a caller to place a telephone call to a callee. A telephone number for the call is registered in a telephone number mapping (ENUM) database to receive incoming telephone calls via a Voice over Internet Protocol (VoIP) network. The at least one telephone network element receives an indication of a preference of the caller to carry the telephone call via one of a public switched telephone network (PSTN) and a public land mobile network (PLMN), instead of via the VoIP network. Based on the preference, the method inhibits an ENUM query of the ENUM database for the telephone call and forwards the telephone call to a gateway to carry the telephone call to the callee via one of the PSTN and the PLMN instead of via the VoIP network.

20 Claims, 3 Drawing Sheets

METHOD AND SYSTEM TO BYPASS ENUM TO REACH A CALLEE VIA A PSTN OR A PLMN

CLAIM OF PRIORITY

This application claims priority from and is a continuation of U.S. patent application Ser. No. 11/482,098 filed Jul. 6, 2006, entitled "METHOD AND SYSTEM TO BYPASS ENUM TO REACH A CALLEE VIA A PSTN OR A PLMN" which is incorporated by reference herein in its entirety.

FIELD OF THE DISCLOSURE

The present disclosure is generally related to providing a telephone service that bypasses an electronic telephone number mapping (ENUM) database.

BACKGROUND

A telephone service provider may provide an Internet Protocol (IP) telephony service, such as Voice over IP (VoIP), for its subscribers. To receive an IP telephony call, a subscriber may have his/her E.164 telephone number registered in an ENUM database. The ENUM database and a Domain Name System (DNS) database are queried to translate the E.164 telephone number into a list of routable Uniform Resource Identifiers (URIs) associated with the subscriber. The translation may be based on a format specified by IETF RFC 3761. An incoming telephone call for the subscriber is directed to an IP end point based on a query of the ENUM/DNS databases.

DETAILED DESCRIPTION

In some cases, either a caller or an ENUM subscriber may prefer that a call to the ENUM subscriber be carried by a Public Switched Telephone Network (PSTN) or a Public Land Mobile Network (PLMN) rather than an IP network, and be terminated at a PSTN/PLMN end point of the subscriber rather than an IP end point of the subscriber. The preference for routing the call via the PSTN/PLMN or IP network may be based on one or more associated factors such as privacy, quality of service, voice clarity, network delay, reliability and customer premises equipment (CPE) availability.

For ease of discussion, embodiments are described for bypass routing to a PSTN and a PSTN phone, instead of repeatedly describing that the embodiments also apply to bypass routing to a PLMN and a wireless phone. Therefore, those having ordinary skill will recognize that references herein to a PSTN can be replaced by a PLMN.

Disclosed herein are embodiments of methods and systems that provide flexible routing of calls to an ENUM subscriber. Based on a preference of either a caller or a callee (the callee being an ENUM subscriber), embodiments bypass an otherwise mandated, default ENUM/DNS query for a call to the ENUM subscriber, and instead carry the call via the PSTN and terminate the call on a PSTN side of the ENUM subscriber.

Figure 1:
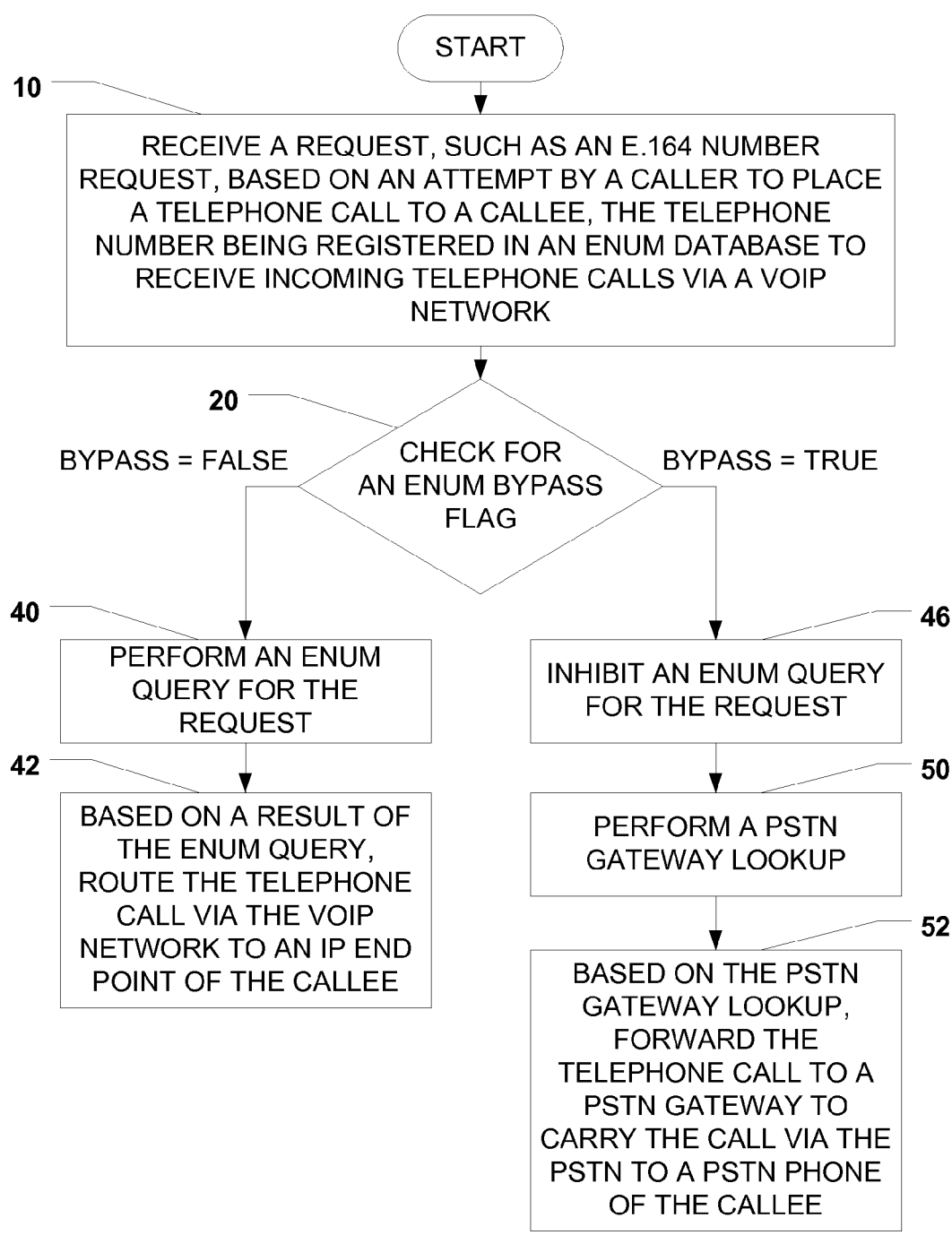
FIG. 1 is a flow chart of an embodiment of a method of flexibly routing telephone calls to ENUM subscribers.
Figure 2:
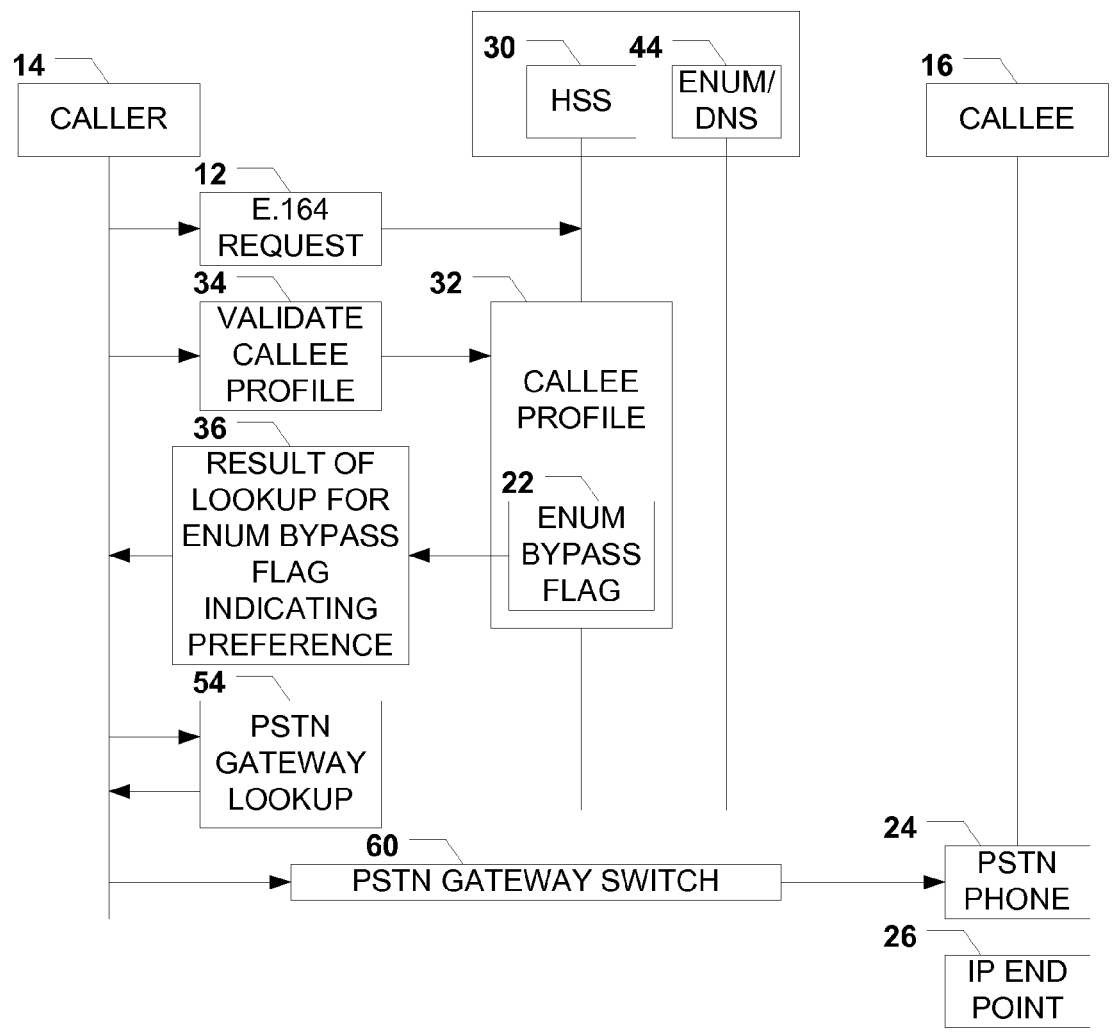
FIG. 2 is a block diagram of an embodiment of a system for flexibly routing telephone calls to ENUM subscribers.

Embodiments are described with reference to FIG. 1, which is a flow chart of an embodiment of a method of routing telephone calls to ENUM subscribers, and FIG. 2, which is a block diagram of an embodiment of a system for routing telephone calls to ENUM subscribers. The ENUM subscribers are subscribers to an IP telephony service (e.g. a VoIP service) who have registered their telephone numbers (e.g. their E.164 numbers) with an ENUM service.

As indicated by block 10, the method comprises receiving a request 12 based on an attempt by a caller 14 to place a telephone call to a telephone number of a callee 16. The telephone number may comprise an E.164 telephone number of the callee 16. The request 12 may comprise an E.164 request.

As indicated by block 20, the method comprises determining if a data element 22 indicates a preference to carry the telephone call via a PSTN instead of a VoIP network and to terminate the telephone call at a PSTN phone 24 of the callee 16 rather than an IP end point 26 of the callee 16.

The data element 22 may indicate a preference of the callee 16. For example, before the call was attempted, the callee 16 may have indicated a particular set of one or more caller telephone numbers that the callee 16 prefers to communicate via the PSTN instead of the VoIP network. Alternatively, the callee 16 may have indicated his/her preference that all incoming calls are to be carried via the PSTN instead of the VoIP network.

In a particular embodiment, the data element 22 comprises an ENUM bypass flag that reflects the preference of the callee 16. The data element 22 can be set up at any registration server 30 including but not limited to a Home Subscriber Server (HSS). The registration server 30 may store the data element 22 in a callee profile 32 associated with the callee 16. In this case, a lookup operation of the callee profile 32 can be performed to determine a preference indicated by the data element 22, such as the ENUM bypass flag. Validation of the callee profile 32 is indicated by block 34. A result of the lookup for the ENUM bypass flag in the callee profile 32 is indicated by block 36.

The registration server 30 may store different values of the ENUM bypass flag for different ENUM subscribers. For example, a first ENUM subscriber may have a first ENUM bypass flag that indicates that incoming telephone calls from a set of telephone numbers are to be terminated at a first PSTN phone (rather than a first IP end point) of the first ENUM subscriber, and a second ENUM subscriber may have a second ENUM bypass flag that indicates that incoming telephone calls from a different set of telephone numbers are to be terminated at a second PSTN phone (rather than a second IP end point) of the second ENUM subscriber. Further, an ENUM subscriber may be enabled to change the value of its associated ENUM bypass flag to reflect changes in his/her preference for carrying incoming telephone calls.

Alternatively, the data element 22 may indicate a preference of the caller 14. The caller 14 may input a command using his/her telephone to indicate his/her preference to conduct the particular telephone call via the PSTN instead of the VoIP network. The command may comprise a voice command or a keyed command, for example, inputted by the caller 14 to set the data element 22 to indicate that ENUM should be bypassed. The caller 14 may input the command to bypass ENUM either before or after dialing the telephone number of the callee 16. In this way, dynamic selections of whether or not to bypass ENUM can be made by the caller 14.

The dynamic selections can be used to selectively turn on the ENUM bypass flag, for example.

As indicated by blocks 40 and 42, if the data element 22, such as the ENUM bypass flag, indicates that an ENUM query is not to be bypassed (i.e. that the telephone call is to be carried by the VoIP network and to be terminated at the IP end point 26 of the callee 16), the method comprises performing at least one query based on the E.164 telephone number of the callee 16 and routing the telephone call to the IP end point 26 of the callee 16 based on at least one result of the at least one query. The at least one query may comprise a first query of an ENUM database that returns one or more SIP URIs associated with the E.164 telephone number of the callee 16. The at least one query may comprise a second query based on a domain name of a SIP URI resulting from the first query. The second query may be of a DNS database that returns one or more SIP URIs or IP addresses associated with the domain name. The ENUM database and the DNS database, whether they be co-located or at different locations, are collectively indicated by reference numeral 44.

As indicated by block 46, if the data element 22, such as the ENUM bypass flag, indicates a preference that the telephone call be terminated at the PSTN side, then the method comprises inhibiting an ENUM/DNS query to the ENUM/DNS database(s) 44. Thus, the ENUM/DNS query, which otherwise is normally mandated because the callee 16 has registered its E.164 number for ENUM service, is skipped, bypassed, or otherwise not performed because of the caller's preference or the callee's preference as reflected by the ENUM bypass flag 22.

As indicated by blocks 50 and 52, the method comprises performing a PSTN gateway lookup 54 and forwarding the telephone call to a gateway such as a PSTN gateway switch 60 based on the lookup. These acts may comprise performing a PSTN connection request. Based on the PSTN connection request, the PSTN gateway switch 60 causes the telephone call to be carried via the PSTN and terminated at the PSTN phone 24 of the callee 16. For increased security, the telephone call can be carried by a dedicated trunk or a secure communication channel, for example.

The ENUM bypass flag enables telecommunication carriers who offer VoIP services to retain a capability to complete calls using a time division multiplex (TDM) method. For example, government accounts, high-visibility accounts, and other premium TDM customers may be unable to avoid entries for provider ENUM to facilitate long-haul VoIP connections. Using the ENUM bypass flag, these customers can request that incoming calls be routed via TDM instead of IP telephony. The ENUM bypass flag may be based on a preference of the caller 14 and/or a preference of the callee 16.

The acts described herein are performed by at least one telephone network element of a telecommunication system. The at least one telephone network element may comprise either a single telephone network element or a plurality of telephone network elements.

Figure 3:
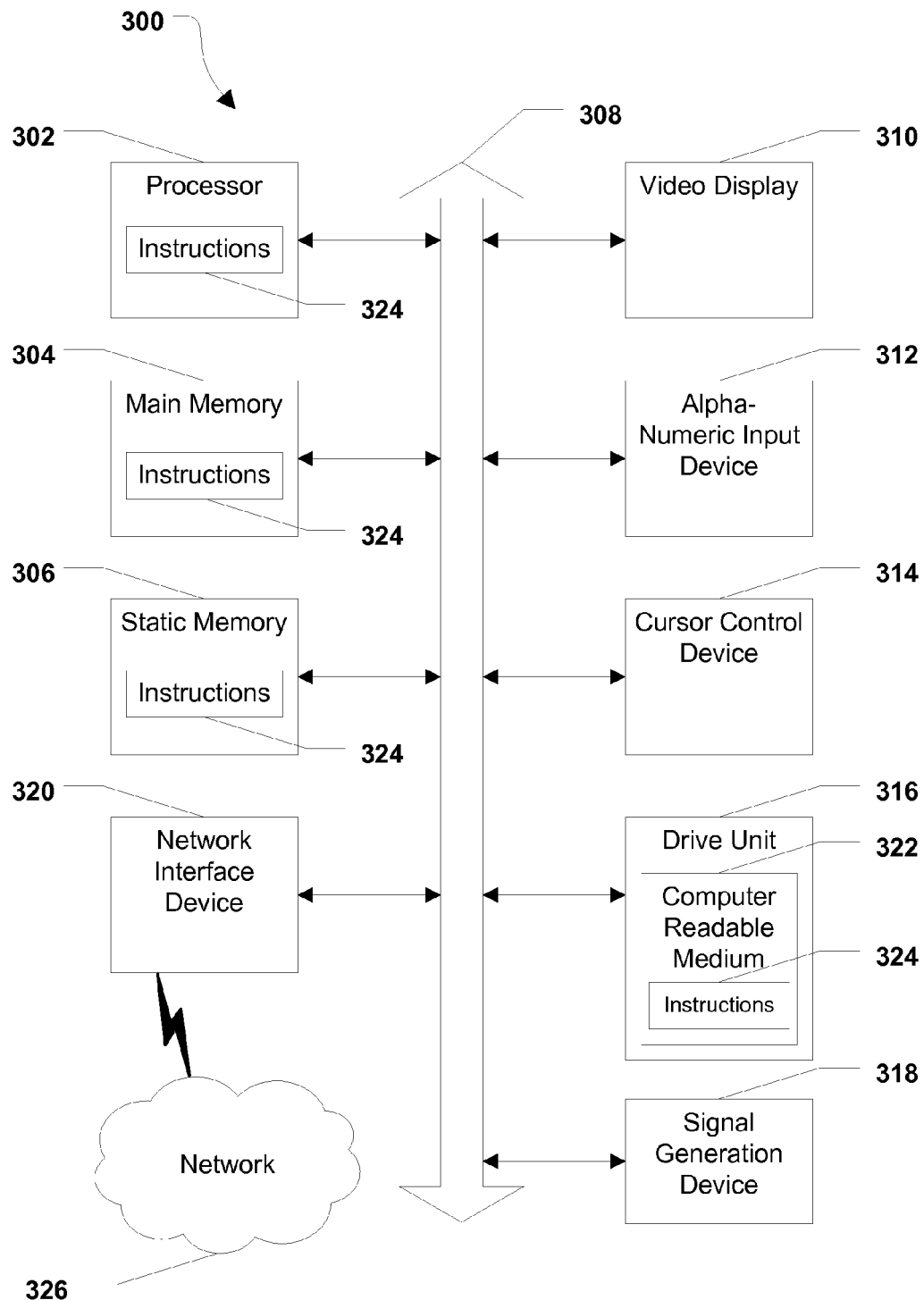
FIG. 3 is a block diagram of an illustrative embodiment of a general computer system.

Referring to FIG. 3, an illustrative embodiment of a general computer system is shown and is designated 300. The computer system 300 can include a set of instructions that can be executed to cause the computer system 300 to perform any one or more of the methods or computer based functions disclosed herein. The computer system 300 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302, e.g., a central processing unit (CPU), a graphics processing unit (GPU), or both. Moreover, the computer system 300 can include a main memory 304 and a static memory 306, that can communicate with each other via a bus 308. As shown, the computer system 300 may further include a video display unit 310, such as a liquid crystal display (LCD), an organic light emitting diode (OLED), a flat panel display, or a solid state display. Additionally, the computer system 300 may include an input device 312, such as a keyboard, and a cursor control device 314, such as a mouse. The computer system 300 can also include a disk drive unit 316, a signal generation device 318, such as a speaker or remote control, and a network interface device 320.

In a particular embodiment, as depicted in FIG. 3, the disk drive unit 316 may include a computer-readable medium 322 in which one or more sets of instructions 324, e.g. software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 324 or receives and executes instructions 324 responsive to a propagated signal, so that a device connected to a network 326 can communicate voice, video or data over the network 326. Further, the instructions 324 may be transmitted or received over the network 326 via the network interface device 320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered equivalent to a tangible storage medium. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-readable storage medium comprising executable instructions that, when executed, cause a communication system to:
   receive an attempt of a caller to place a telephone call to a telephone number of a callee, the telephone number being registered in a telephone number mapping (ENUM) database to receive incoming telephone calls via a Voice over Internet Protocol (VoIP) network;
   receive an indication of a preference of the caller to carry the telephone call via one of a public switched telephone network (PSTN) and a public land mobile network (PLMN) instead of via the VoIP network; and
   based on the preference, inhibit an ENUM query of the ENUM database for the telephone call.

2. The computer-readable storage medium of claim 1, wherein the preference of the caller is stored in a profile of the callee.

3. The computer-readable storage medium of claim 2, further comprising executable instructions that, when executed, cause the communication system to determine that the profile of the callee indicates the preference of the caller.

4. The computer-readable storage medium of claim 3, wherein determining that the profile of the callee indicates the preference of the caller comprises performing a lookup of an ENUM bypass flag associated with the callee.

5. The computer-readable storage medium of claim 4, wherein the ENUM bypass flag is stored by a registration server.

6. The computer-readable storage medium of claim 5, wherein the registration server comprises a home subscriber server (HSS).

7. The computer-readable storage medium of claim 1, wherein the act of inhibiting the ENUM query of the ENUM database inhibits an otherwise mandatory query of the ENUM database.

8. The computer-readable storage medium of claim 1, further comprises executable instructions that, when executed, cause the communication system to forward the telephone call to a gateway instead of routing the telephone call to the callee via one of the PSTN and the PLMN based on the preference.

9. A method comprising:
   receiving an attempt of a caller to place a telephone call to a telephone number of a callee, the telephone number being registered in a telephone number mapping (ENUM) database to receive incoming telephone calls via a Voice over Internet Protocol (VoIP) network;
   receiving an indication of a preference of the caller to carry the telephone call via one of a public switched telephone network (PSTN) and a public land mobile network (PLMN) instead of via the VoIP network; and
   based on the preference, forwarding the telephone call to a gateway to carry the telephone call to the callee via one of the PSTN and the PLMN instead of via the VoIP network.

10. The method of claim 9, wherein receiving the indication of the preference of the caller includes receiving a command via telephone from the caller.

11. The method of claim 10, wherein the command comprises one of a voice command and a keyed command.

12. The method of claim 10, further comprising storing the preference in an ENUM bypass flag associated with the callee, wherein the ENUM bypass flag is stored by a registration server.

13. The method of claim 12, wherein the registration server comprises a home subscriber server (HSS).

14. The method of claim 12, wherein the ENUM bypass flag is stored in a profile of the callee.

15. The method of claim 9, further comprising based on the preference, inhibiting an ENUM query of the ENUM database, the ENUM query associated with the telephone call.

16. A system comprising:
   at least one telephone network element to:
      receive an attempt of a caller to place a telephone call to a telephone number of a callee, the telephone number being registered in a telephone number mapping (ENUM) database to receive incoming telephone calls via a Voice over Internet Protocol (VoIP) network;
      receive an indication of a preference of the caller to carry the telephone call via one of a public switched telephone network (PSTN) and a public land mobile network (PLMN) instead of via the VoIP network;
      based on the preference, inhibit an ENUM query of the ENUM database for the telephone call; and
      based on the preference, forward the telephone call to a gateway to carry the telephone call to the callee via one of the PSTN and the PLMN instead of via the VoIP network.

17. The system of claim 16, wherein the preference is stored in a profile of the callee, wherein the at least one telephone network element is to determine that the profile of the callee indicates the preference, wherein determining that the profile of the callee indicates the preference includes performing a lookup of an ENUM bypass flag associated with the callee.

18. The system of claim 17, wherein the ENUM bypass flag is stored by a registration server.

19. The system of claim 18, wherein the registration server comprises a home subscriber server (HSS).

20. The system of claim 17, wherein the ENUM bypass flag is stored in the profile of the callee.

* * * * *